United States Patent
Byun et al.

(10) Patent No.: US 10,980,080 B2
(45) Date of Patent: Apr. 13, 2021

(54) METHOD FOR REPORTING RRC STATE OF TERMINAL AND APPARATUS FOR SUPPORTING SAME

(71) Applicant: LG Electronics Inc., Seoul (KR)

(72) Inventors: Daewook Byun, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/312,909

(22) PCT Filed: Jun. 21, 2017

(86) PCT No.: PCT/KR2017/006493
§ 371 (c)(1),
(2) Date: Dec. 21, 2018

(87) PCT Pub. No.: WO2017/222290
PCT Pub. Date: Dec. 28, 2017

(65) Prior Publication Data
US 2019/0335527 A1    Oct. 31, 2019

Related U.S. Application Data

(60) Provisional application No. 62/418,000, filed on Nov. 4, 2016, provisional application No. 62/364,290, filed
(Continued)

(51) Int. Cl.
*H04W 76/27*     (2018.01)
*H04W 8/08*      (2009.01)
(Continued)

(52) U.S. Cl.
CPC ............. *H04W 76/27* (2018.02); *H04W 8/08* (2013.01); *H04W 24/10* (2013.01); *H04W 72/04* (2013.01)

(58) Field of Classification Search
CPC ....... H04W 76/27; H04W 8/08; H04W 24/10; H04W 72/04
See application file for complete search history.

(56) References Cited

U.S. PATENT DOCUMENTS 9,794,973 B2 * 10/2017 Kim ..................... H04W 8/005
2010/0142488 A1 * 6/2010 Zhang ............... H04W 36/0022
370/332
(Continued)

FOREIGN PATENT DOCUMENTS

KR    10-2011-0122029    11/2011
WO    2014084675         6/2014
(Continued)

OTHER PUBLICATIONS

Intel Corporation,"Benefits of Light connection over Suspend-Resume procedure," 'R2-163631,' 3GPP TSG RAN WG2 Meeting #94, Nanjing, China, May 23-27, 2016, 10 pages.
(Continued)

*Primary Examiner* — Chi H Pham
*Assistant Examiner* — Weibin Huang
(74) *Attorney, Agent, or Firm* — Fish & Richardson P.C.

(57) ABSTRACT

Proposed are a method for reporting an RRC state of a terminal by a base station in a wireless communication system and an apparatus for supporting the same. A method for reporting an RRC state according to an embodiment of the present invention may comprise a step of reporting an RRC state of a terminal to a mobility management (MM).

15 Claims, 10 Drawing Sheets

Related U.S. Application Data on Jul. 19, 2016, provisional application No. 62/352,566, filed on Jun. 21, 2016.

(51) Int. Cl.
*H04W 24/10* (2009.01)
*H04W 72/04* (2009.01)

(56) References Cited

U.S. PATENT DOCUMENTS

| | | | | |
|---|---|---|---|---|
| 2011/0255471 | A1* | 10/2011 | Sundell | H04W 36/02 370/328 |
| 2013/0260810 | A1 | 10/2013 | Rayavarapu | |
| 2015/0173017 | A1* | 6/2015 | Rakotoharison | H04W 52/0222 370/311 |
| 2015/0282082 | A1* | 10/2015 | Landais | H04W 76/28 370/311 |
| 2015/0312960 | A1* | 10/2015 | Kim | H04W 72/04 370/329 |
| 2015/0341978 | A1* | 11/2015 | Rune | H04W 48/12 370/254 |
| 2017/0367058 | A1* | 12/2017 | Pelletier | H04W 56/0045 |
| 2018/0352488 | A1* | 12/2018 | Selvaganapathy | H04W 36/04 |
| 2019/0082490 | A1* | 3/2019 | Zhang | H04W 48/08 |
| 2019/0223152 | A1* | 7/2019 | Ke | H04W 76/25 |

FOREIGN PATENT DOCUMENTS

| | | |
|---|---|---|
| WO | WO2015/035591 | 3/2015 |
| WO | WO2015/085273 | 6/2015 |

OTHER PUBLICATIONS

Ericsson, "RRC Suspend/Resume for Light Connection," 'R2-164227,' 3GPP TSG-RAN WG2 #94, Nanjing, P.R. Ching, May 23-27, 2016, 6 pages.

EP Supplementary Search Report in European Application No. EP17815703, dated Dec. 16, 2019, 10 pages.

Ericsson, "Infrequent small data transmissions for inactive UEs", R2-164028, 3GPP TSG-RAN WG2 #94, Nanjing, P.R. China, May 23-27, 2016, 5 pages.

Nokia Networks, "Solution: Mobility Framework", S2-161276, SA WG2 Meeting #S2-113ah, Feb. 23-26, 2016, Sophia Antipolis, FR, 5 pages.

* cited by examiner

METHOD FOR REPORTING RRC STATE OF TERMINAL AND APPARATUS FOR SUPPORTING SAME

CROSS-REFERENCE TO RELATED APPLICATIONS

This application is a National Stage application under 35 U.S.C. § 371 of International Application No. PCT/KR2017/006493, filed on Jun. 21, 2017, which claims the benefit of U.S. Provisional Application No. 62/418,000, filed on Nov. 4, 2016, U.S. Provisional Application No. 62/364,290, filed on Jul. 19, 2016, and U.S. Provisional Application No. 62/352,566, filed on Jun. 21, 2016. The disclosures of the prior applications are incorporated by reference in their entirety.

BACKGROUND OF THE INVENTION

Field of the Invention

The present invention relates to a wireless communication system and, more particularly, to a method for reporting, by a base station, the RRC state of a user equipment to a mobility management entity and an apparatus for supporting the same.

Related Art

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Regarding a new RRC state of a UE introduced in 5G, a problem may arise in interaction between base-stations or between a base station and a mobility management entity (MME) when the RRC connection state of the UE is changed, and it is required to develop a technology for solving the problem.

SUMMARY OF THE INVENTION

Regarding the RRC state of a UE discussed in 5G, it matters how to manage UE context of a UE when the UE moves from one eNB to another eNB. That is, UE context is stored in an anchor eNB connected with the UE, and it matters how to deliver the UE context from an existing anchor eNB to a new anchor eNB when the UE moves from the existing anchor eNB to the new anchor eNB.

According to an embodiment of the present invention, a method performed by a base station in a wireless communication system is provided. The method may comprise: reporting a radio resource control (RRC) state of a user equipment (UE) to mobility management (MM).

The MM may be mobility management entity (MME).

The reporting may be performed when the RRC state transits from RRC_CONNECTED state to RRC_IDLE state or to RRC_INACTIVE state.

The reporting may be performed when the RRC state transits from RRC_IDLE state to RRC_CONNECTED state or to RRC_INACTIVE state.

The reporting may be performed via S1 interface between the base station and the MM, or via NG1 control plane (CP) interface.

The method may further comprise: allocating a UE context of the UE to the UE, before the reporting is performed.

The reporting may include: transmitting RRC state information informing the RRC state of the UE and UE context of the UE to the MM.

The reporting may report the RRC state information and the UE context to the MM via an initial UE message.

The reporting the RRC state of the UE may include: transmitting information on recommended cells or base station that the UE is able to access.

The base station may be an eNodeB (eNB) or gNodeB (gNB).

According to another embodiment of the present invention, a method performed by a mobility management (MM) in a wireless communication system is provided. The method may comprise: receiving a radio resource control (RRC) state of a user equipment (UE) from a base station.

The receiving may be performed via S1 interface between the base station and the MM, or via NG1 control plane (CP) interface.

The receiving the RRC state may include: receiving RRC state information informing the RRC state of the UE and UE context of the UE.

The method may further comprise: determining whether to trigger S1 signal related to the UE or NG1 signal related to the UE based on the received RRC state of the UE.

According to another embodiment of the present invention, a base station in a wireless communication system is provided. The base station may comprise: a transceiver for transmitting or receiving a radio signal; and a processor coupled to the transceiver, the processor configured to: report a radio resource control (RRC) state of a user equipment (UE) to mobility management (MM).

As a base station transmits an ID including RRC connection state information on a UE and UE context to an MME, the MME can efficiently manage RRC connection state information on each UE and can share the UE context even with a base station connected to the MME.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A/5G. However, technical features of the present invention are not limited thereto.

Figure 1:
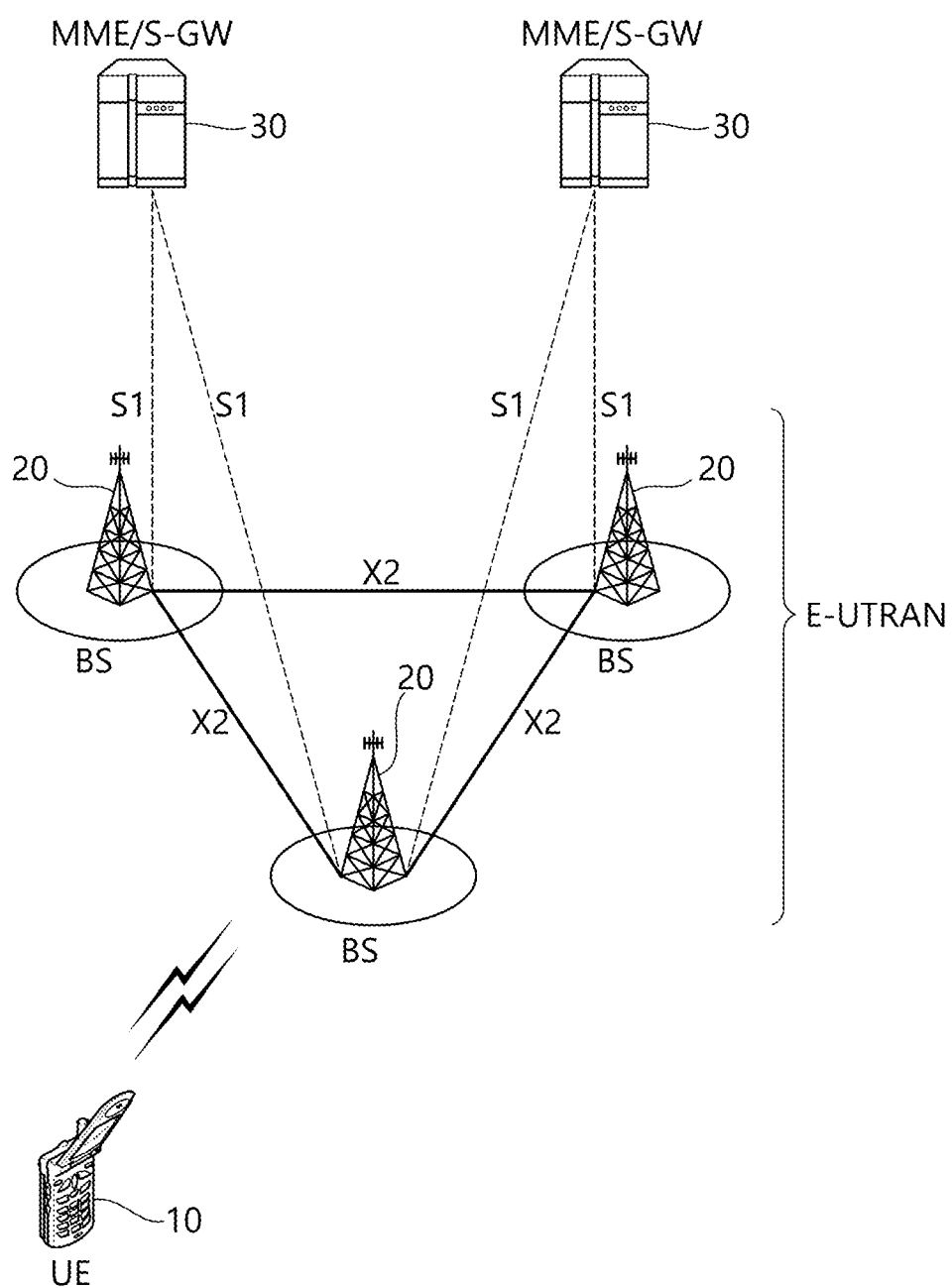
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
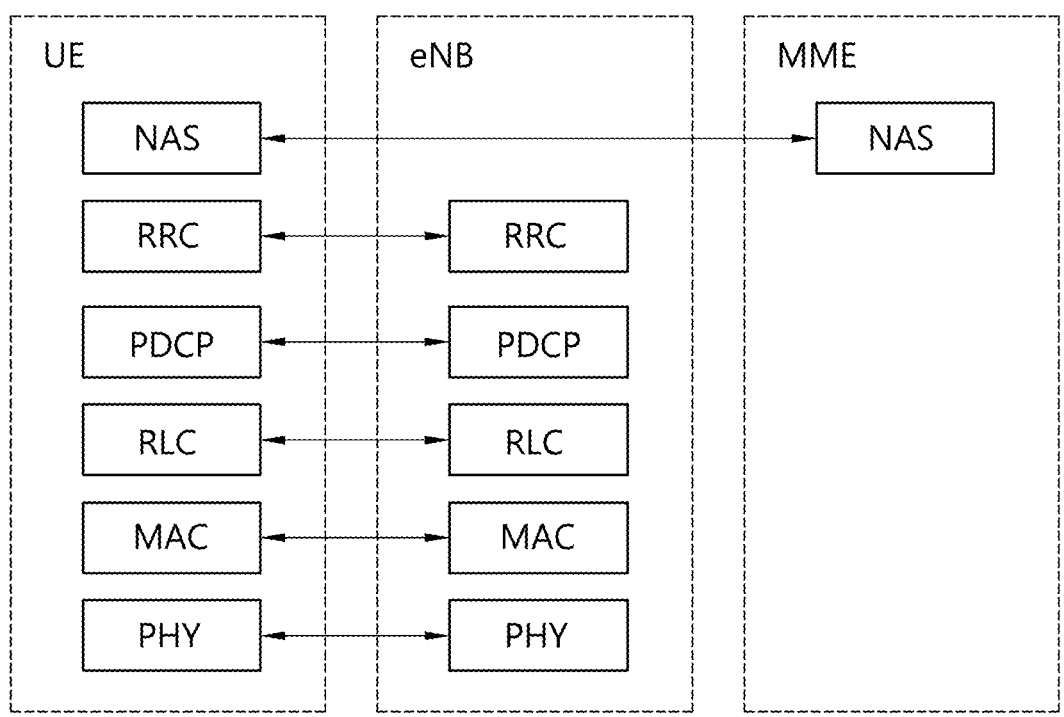
FIG. 2 shows a block diagram of a control plane protocol stack of an LTE system.
Figure 3:
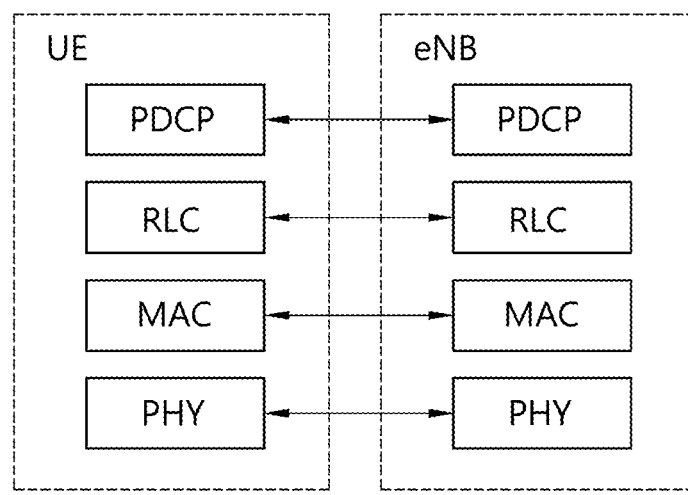
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Hereinafter, a 5G network structure is described.

Figure 4:
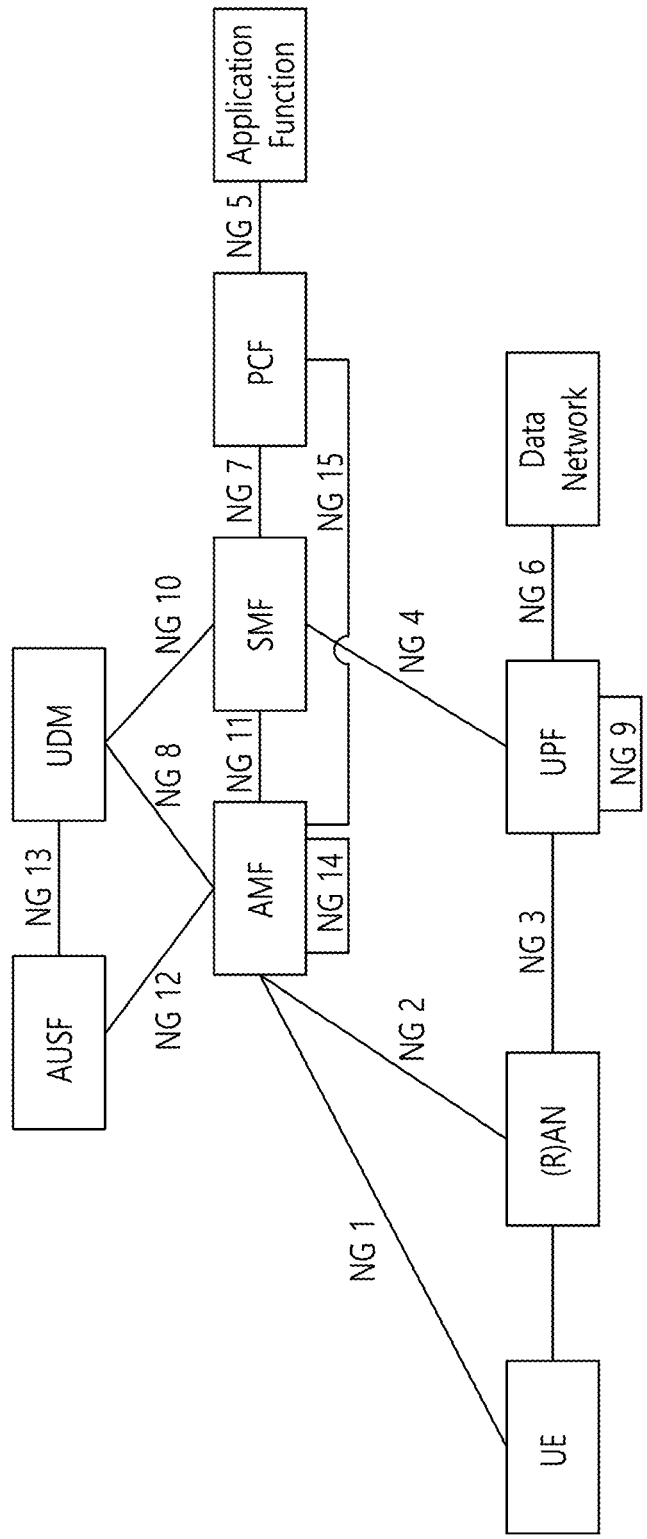
FIG. 4 shows a structure of a 5G system.

FIG. 4 shows a structure of a 5G system.

As the development and commercialization of specifications of the 4G mobile communication system (IMT-Advanced) have been completed, studies are being actively conducted to secure 5G (5G) mobile communication technology and systems early. The 3GPP, which has successfully developed the LTE-Advanced system as the 4th generation standard, has already started activities to standardize 5G mobile communication specifications, and a standardization working group is having a discussion about 5G mobile communication tentatively named new radio (NR).

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

A radio access network (RAN) may be a BS using a new RAT. In this specification, a 5G RAN, a RAN, a BS, an RAN node, a gNB, a next-generation Node B, a new RAN, and a new radio base station (NR BS) may refer to a newly defined BS for 5G. An AN may be a general BS that includes a non-3GPP access technology, such as Wi-Fi.

An NG2 reference point may be defined between the RAN (or AN) and an access and mobility function (AMF). An NG3 reference point may be defined between the RAN (or AN) and a user plane function (UPF). Control plane (CP) functions may include various functions to control the network and a UE. Representative CP functions may include the AMF responsible for mobility management and a session management function (SMF) responsible for session management. Since the AMF provides a function independent of an access technology (i.e., an access and mobility management function per UE), each UE can be basically connected to one AMF. For the SMF, however, a UE having a plurality of sessions may be allocated a different SMF per session.

An application function may provide information on packet flow to a policy control function (PCF) responsible for policy control in order to ensure Quality of Service (QoS). Based on this information, the PCF may determine policies for session management and mobility management and may deliver the policies to the AMF and the SMF. Accordingly, mobility management, session management, and QoS management may be appropriately performed.

A data network may transmit a protocol data unit (PDU) to be transmitted via a downlink to a UPF or may receive a PDU transmitted from the UE through the UPF. An NG6 reference point may be defined between the UPF and the data network.

An NG4 reference point may be defined such that the UPF can be established using control signal information generated by the SMF and can report the state thereof to the SMF. An NG1 reference point may be defined between the UE and the AMF. An authentication server function (AUSF) may store data for authentication of the UE, and a user data management (UDM) may store a user's subscription data, policy data, and the like.

Hereinafter, the RRC state of a UE in 5G will be described.

An upper layer protocol defines a protocol state to consistently manage an operational state of a UE and indicates a function and procedure of the UE in detail. In the discussion on NR standardization, an RRC state is defined to basically have as an RRC_CONNECTED state and an RRC_IDLE state, and an RRC_INACTIVE state is additionally introduced.

The RRC_INACTIVE state is a state introduced to efficiently manage an mMTC UE. In this state, with a radio access resource released and a wired connection (gNB-NGC) established, the UE is configured to immediately connected when having new traffic. The UE in the INACTIVE state performs a radio control procedure similar to that in the RRC_IDLE state in order to reduce power consumption. However, a connection state between the UE and a network is maintained similarly to in the RRC_CONNECTED state in order to minimize a control procedure when the UE transitions to the RRC_CONNECTED state.

The 3GPP has discussed light connection related to the RRC connection state of a 5G UE. Light connection is an intermediate RRC state newly defined to maintain UE context during short transition in the RRC connection state of a UE. Light connection may be applied to large-scale MTC applications using small-size data transmission. A light connection state may correspond to the RRC_INACTIVE state.

When a UE in the light connection (light-connected) state moves from one eNB to another eNB, it matters how to manage UE context of the UE. That is, UE context is stored in an anchor eNB connected with the UE, and it matters how to deliver the UE context from an existing anchor eNB to a new anchor eNB when the UE moves from the existing anchor eNB to the new anchor eNB.

Specifically, when the UE is in the light-connected state, an S1 interface (S1 control plane interface) between an eNB and a mobility management entity (MME) can be always kept connected, and thus data on the UE (e.g., UE context) stored in the MME may be transmitted to each eNB via a downlink, instead of being separately stored in a serving gateway (S-GW). When the S1 interface is always kept connected, it is possible to save resources and time required to release and reconnect the S1 interface. For example, the eNB may store UE context and may transmit a paging message to a corresponding area to search for a corresponding UE. When the UE responds to the paging message, the eNB may transmit the UE context to the UE. When the UE departs from the coverage of the eNB and responds to another eNB, the other eNB receiving the response may not have data about the UE. In this case, the eNB receiving the response needs to receive the data from the eNB transmitting the paging message. According to the related art, the new eNB can receive the UE context from the existing eNB using a UE context recovery procedure through an X2 interface (X2 control plane interface). However, when there is no X2 interface between the eNBs, it is impossible to directly transmit data between the eNB transmitting the paging message and the eNB receiving the response from the UE. Therefore, a new technique for managing UE context between two eNBs having no X2 interface connected is required.

Figure 5:
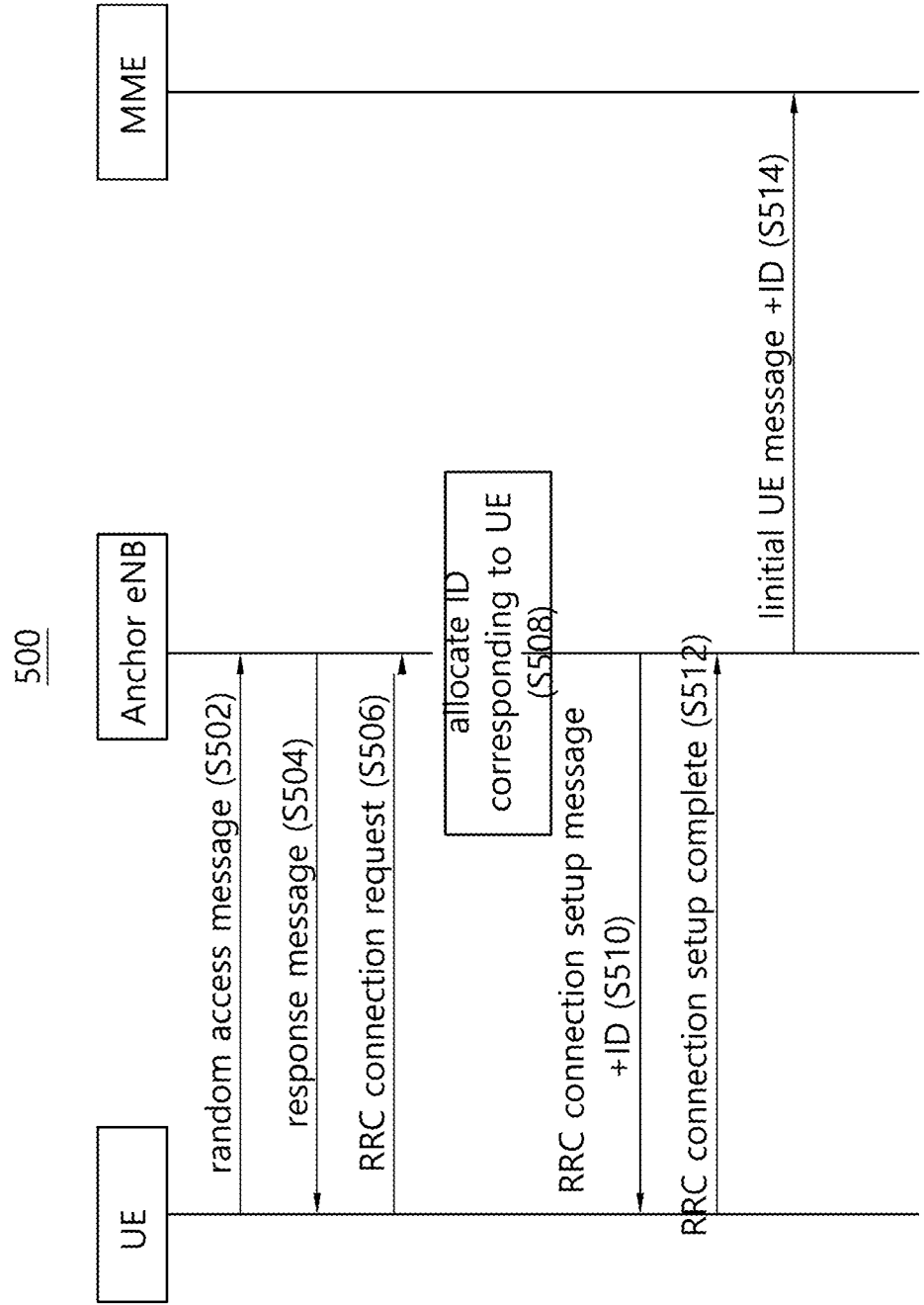
FIG. 5 is a flowchart illustrating a method for reporting the RRC state of a UE according to one embodiment of the present invention.

FIG. 5 is a flowchart illustrating a method for reporting the RRC state of a UE according to one embodiment of the present invention. The present embodiment relates to a method for managing UE context between eNBs or between an eNB and an MME and may further provides a method for reporting the RRC state of a UE (to an upper layer). In the present embodiment, the UE does not have an ID allocated from an eNB, and an S1 interface connection between an eNB and an MME may be maintained or created according to the present embodiment.

A UE may transmit a random access message (preamble) to an anchor eNB (S502). Here, the UE may be in the RRC_IDLE state. Next, an eNB may transmit a response message to the random access message received from the UE (S504).

The UE may request an RRC connection to the anchor eNB (S506). According to one embodiment, the UE may transmit an RRC connection request message to the eNB.

The anchor eNB may allocate an ID corresponding to the UE (S508). That is, the anchor eNB may identify that there is no ID in the RRC connection request message received from the UE and may allocate a new ID. Specifically, the UE may provide an ID that the UE has to the eNB, thereby indicating which eNB has UE context of the UE. However, when the UE does not have an ID allocated in advance, the UE cannot provide the ID thereof to the eNB, and the eNB provided with no ID may allocate a new ID for the UE. Here, the allocated ID may be stored in the UE context of the UE, and the eNB allocating the ID may store the UE context including the ID. In this description, the ID allocated to the UE may be an L-ID, which may be identification information on the UE that the UE is allocated by the eNB in the light connection state.

Next, the anchor eNB may provide the newly allocated ID to the UE through an RRC connection setup message (S510).

The UE may transmit an RRC connection setup complete message including an NAS connection request message to the eNB (S512). Accordingly, the UE may enter the RRC_CONNECTED state.

The eNB may transmit an initial UE message including the NAS connection request message received from the UE to the MME (S514). The initial UE message may include the ID of the UE, and the ID of the UE may indicate which anchor eNB allocates the ID to the UE. The eNB may report the RRC state of the UE to the MME by forwarding the ID of the UE. Here, the RRC state of the UE is the RRC_CONNECTED state, and the eNB may report to the MME that the UE is in the RRC_CONNECTED state. Further, the MME may autonomously know that the RRC state of the UE is the RRC_CONNECTED state, in which case no separate forwarding operation is required.

Figure 6:
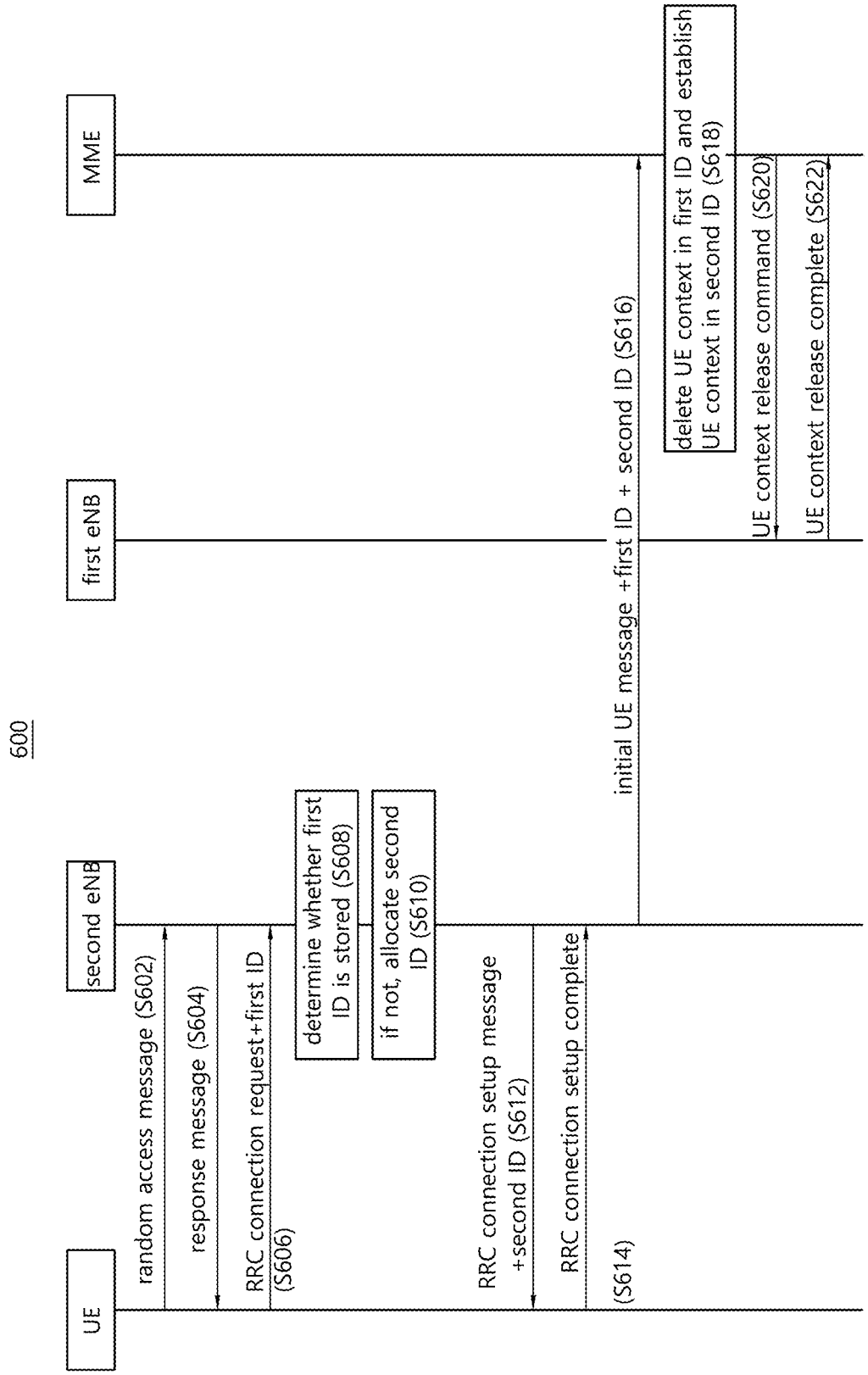
FIG. 6 is a flowchart illustrating a method for reporting the RRC state of a UE according to another embodiment of the present invention.

FIG. 6 is a flowchart illustrating a method for reporting the RRC state of a UE according to another embodiment of the present invention. It is assumed in the present embodiment that the UE is already allocated an ID from an existing anchor eNB (first eNB), and the first eNB stores UE context with an S1 interface connection with an MME still maintained. Further, an S1 interface connection between a second eNB and the MME may be maintained or created through the present embodiment, in which case the S1 interface connection between the first eNB and the MME may be released.

A UE may transmit a random access message (preamble) to a new anchor eNB (second eNB) (S602). According to one embodiment, the UE in the light connection state may depart from the coverage of the first eNB to move to the coverage of the second eNB, and may thus attempt to access the second eNB. Here, there may be no X2 connection between the second eNB and the first eNB, and the UE may be in the RRC_IDLE state. Next, the second eNB may transmit a response message to the random access message received from the UE (S604).

The UE may request an RRC connection to the second eNB (S606). According to one embodiment, the UE may transmit an RRC connection request message to the eNB, and the RRC connection request message may include an existing ID (first ID). Here, the first ID may be identification information on the UE allocated by the first eNB. That is, the UE may attempt the RRC connection to the second eNB using the first ID.

The second eNB may determine whether the second eNB has UE context corresponding to the first ID received from the UE (S608). When the second eNB fails to discover the UE context, the second eNB may determine to establish new UE context. Accordingly, the second eNB may allocate an ID (second ID) as a part of the new UE context to the UE instead of the first ID (S610).

The second eNB may transmit an RRC connection setup message including the second ID to the UE (S612).

The UE may transmit an RRC connection setup complete message including an NAS service request message to the second eNB in response to the RRC connection setup message (S614).

To set up new UE context, the second eNB may transmit an initial UE message to the MME (S616). The initial UE message may include the first ID and the second ID of the UE. The first ID may indicate that the existing UE context is stored in the first eNB, and the second ID may indicate that the new UE context is stored in the second eNB.

When receiving the initial UE message along with the first ID and the second ID from the second eNB, the MME may establish the new UE context (S618). The MME may trigger a UE context establishment procedure relating to the second ID and may delete the UE context relating to the first ID. The MME may retrieve which eNB stores the UE context relating to the first ID. This is because the MME receives appropriate information relating to the first ID from the first eNB when establishing the existing UE context, and needs to request an existing UE context release procedure relating to the first ID to the first eNB when triggering a new UE context establishment procedure. Accordingly, the new UE context may be established in the second eNB.

The MME may transmit a UE context release command message to the first eNB (S620). Accordingly, the first eNB may release or delete the first ID and the UE context relating to the first ID.

The first eNB may transmit a UE context release complete message to the MME (S622).

Figure 7:
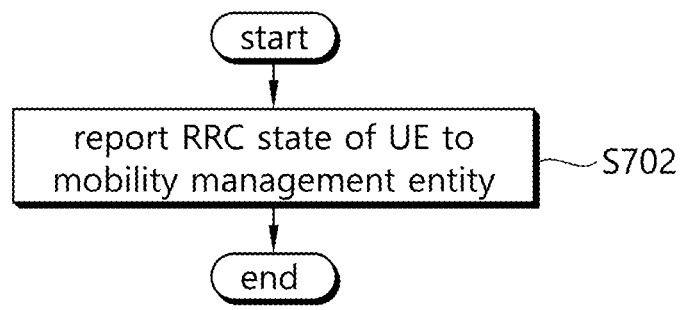
FIG. 7 is a flowchart illustrating a method for reporting the RRC state of a UE according to one embodiment of the present invention.

FIG. 7 is a flowchart illustrating a method for reporting the RRC state of a UE according to one embodiment of the present invention.

ABS may report the RRC state of a UE to a mobility management (MM) (S702). According to one embodiment, the MM may be a mobility management entity (MME). The MM may be similar in operation and function to the MME but may operate in a different network system (e.g., LTE or new RAT). In the following description, the MM and the MME may be interchangeable with each other. The RRC state of the UE may be an RRC_CONNECTED state or an RRC_IDLE state. Further, an operation of reporting the RRC connection state may be performed when the RRC state of the UE is changed from the RRC_CONNECTED state to the RRC_IDLE state or RRC_INACTIVE state or from the RRC_IDLE state to the RRC_INACTIVE state or RRC_CONNECTED state. That is, the operation of reporting the RRC state of the UE may be performed only when the RRC state is changed. Further, the operation of reporting the RRC state may be performed through an S1 control plane interface (or NG1) between the BS and the MME (or MM).

Before performing the operation of reporting the RRC state of the UE, the BS may allocate UE context and an ID included in the UE context to the UE. Here, the ID may be an L-ID that is identification information allocated to the UE in the light connection state. Further, the ID may include information on which BS stores the UE context of the UE. In addition, the ID may include RRC state information on the UE. Specifically, the BS may transmit the UE context to the MME, thereby forwarding the ID and reporting the RRC state of the UE.

Further, the operation of reporting the RRC state may include an operation of transmitting a recommended cell or BS that the UE can access. Accordingly, upon receiving the ID, the MME may provide information for efficient RAN paging to the BS using this information.

The BS may provide the ID to the MME through an initial UE message. In the present embodiment, the BS may be an eNB or gNB.

Figure 8:
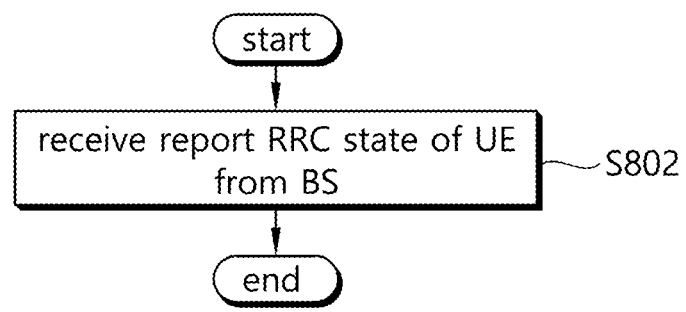
FIG. 8 is a flowchart illustrating a method for receiving a report on the RRC state of a UE according to one embodiment of the present invention.

FIG. 8 is a flowchart illustrating a method for receiving a report on the RRC state of a UE according to one embodiment of the present invention. The present embodiment may be implemented not only in LTE but also in the new RAT as a next-generation communication system. Hereinafter, a gNB, an MM, and an NG1 interface of the new RAT may respectively correspond to an eNB, an MME, and an S1 interface in LTE.

An MM may receive RRC state information on a UE from a BS (S802). According to one embodiment, the MM may be an MME. The MM may be similar in operation and function to the MME but may operate in a different network system (e.g., LTE or new RAT). In the following description, the MM and the MME may be interchangeable with each other.

Specifically, the BS may transmit an ID including RRC state information on the UE and UE context to the MME. That is, the RRC state information may be provided to the MME along with the ID and the UE context. Here, the RRC state of the UE may be the RRC_CONNECTED state. The MME may perform a procedure for establishing the received UE context. The UE context establishment procedure may be performed by a known technology, and a detailed description thereof will be omitted in this description.

The MME (or MM) may receive an ID via an S1 control plane interface (or NG1) with the BS (eNB or gNB). The MME may determine whether to trigger UE-associated S1 signaling based on the RRC state of the UE. In addition, the MME may determine whether to provide the following information to the eNB using a UE context change message (or an existing message). That is, when the context of the UE is changed, the MME may determine whether to provide the following information to the BS using this relevant information.

UE identity index value
UE paging identity
Paging DRX
List of TAIs
List of PAIS
Paging priority
UE radio capability for paging
Assistance data for paging
Paging eDRX information
Extended UE identity index value
NB-IoT paging eDRX information
NB-IoT UE identity index value
Information on a recommended cell and/or BS may be transmitted to the MME along with the RRC state information. In this case, the MME needs to store this information and may use this information in order to provide information for efficient RAN paging to the BS.

Figure 9:
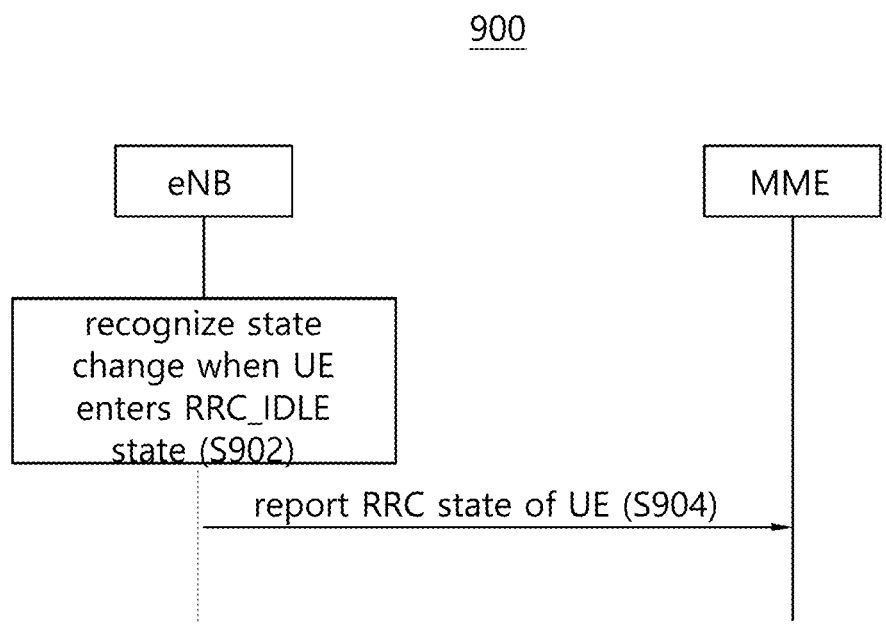
FIG. 9 is a flowchart illustrating a method for reporting the RRC state of a UE according to another embodiment of the present invention.

FIG. 9 is a flowchart illustrating a method for reporting the RRC state of a UE according to another embodiment of the present invention.

When a UE enters the RRC_IDLE state, an eNB (or gNB) may transmit RRC state information on the UE to an MME (or MM). Here, the RRC state information may be transmitted through an S1 (or NG1) interface between the eNB (or gNB) and the MME (or MM). Here, a gNB, an MM, and an NG1 interface correspond to an eNB, an MME, and an S1 interface in 4G, respectively. That is, this embodiment may be applied not only to 4G but also to 5G. However, for the convenience of explanation, it is assumed that the present embodiment is implemented in a 4G environment.

When the UE enters the RRC_IDLE state from the RRC_CONNECTED state, the eNB may recognize this state change (S902). Here, the RRC_IDLE state may include an RRC_INACTIVE state. That is, when the UE in the RRC_CONNECTED state enters the RRC_IDLE state or the RRC_INACTIVE state, the eNB may detect that the UE enters the RRC_IDLE state or the RRC_INACTIVE state. The RRC_INACTIVE state refers to a new RRC state to be defined in an RAT associated with LTE/new RAT, and the term for this state may be changed. This state may be defined based on an existing RRC state or a newly defined RRC state of the UE and whether there is an S1 interface connection for the UE.

The eNB transmits an RRC state indication message to the MME in order to indicate the RRC state of the UE (S904). The RRC state indication message may be included in an existing message or may be indicated as an IE included in a new message or an existing message. Upon receiving the RRC state indication message from the eNB, the MME may store the RRC state of the UE and may determine whether to trigger S1/NG1 UE-associated signaling to the eNB or to provide the following information to the eNB using a UE context change message (or an existing message).

UE identity index value
UE paging identity
Paging DRX
List of TAIs
List of PAIS
Paging priority
UE radio capability for paging
Assistance data for paging
Paging eDRX information
Extended UE identity index value
NB-IoT paging eDRX information
NB-IoT UE identity index value The RRC state indication message may include information on a recommended cell and/or eNB. When this information is included in the RRC state indication message, the MME needs to store this information and may use this information in order to provide information for efficient RAN paging to the eNB.

Figure 10:
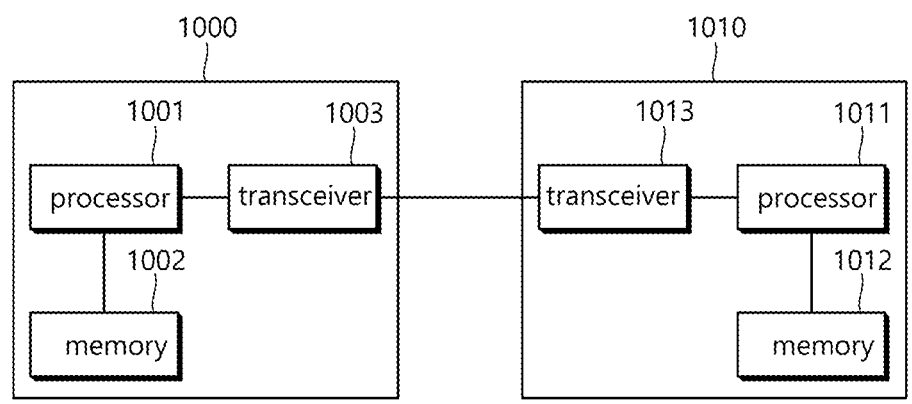
FIG. 10 shows a communication system to implement an embodiment of the present invention.

FIG. 10 is a block diagram illustrating a wireless apparatus in which an embodiment of the present invention can be implemented.

ABS 1000 includes a processor 1001, a memory 1002, and a transceiver 1003. The memory 1002 is coupled to the processor 1001, and stores a variety of information for driving the processor 1001. The transceiver 1003 is coupled to the processor 1001, and transmits and/or receives a radio signal. The processor 1001 implements the proposed functions, procedures, and/or methods. In the aforementioned embodiments, an operation of the BS may be implemented by the processor 1001. In this embodiment, the BS 100 may be an eNB or gNB.

A mobility management entity 1010 includes a processor 1011, a memory 1012, and a transceiver 1013. The memory 1012 is coupled to the processor 1011, and stores a variety of information for driving the processor 1011. The transceiver 1013 is coupled to the processor 1011, and transmits and/or receives a radio signal. The processor 1011 implements the proposed functions, procedures, and/or methods. In the aforementioned embodiments, an operation of the UE 1010 may be implemented by the processor 1011. In this embodiment, the mobility management entity 1010 may be a MME or MM.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a base station in a wireless communication system, the method comprising:
   transmitting, to a core network node, information regarding a radio resource control (RRC) state of a wireless device based on the wireless device entering an RRC inactive state, wherein the wireless device is in a core network connected state during the RRC inactive state; and
   performing a radio access network (RAN) paging for the wireless device based on that the wireless device is in the RRC inactive state.

2. The method of claim 1, wherein the core network node is related to mobility management.

3. The method of claim 1, wherein the information regarding the RRC state of the wireless device is transmitted via at least one of (i) an S1 interface between the base station and the core network node, or (ii) an NG1 control plane (CP) interface between the base station and the core network node.

4. The method of claim 1, further comprising:
allocating a user equipment (UE) context of the wireless device to the wireless device, before transmitting the information regarding the RRC state of the wireless device.

5. The method of claim 4, further comprising:
transmitting the UE context of the wireless device to the core network node.

6. The method of claim 5, wherein the information regarding the RRC state of the wireless device and the UE context of the wireless device is transmitted via an initial UE message.

7. The method of claim 1, wherein the information regarding the RRC state of the wireless device includes:
information regarding recommended cells or base station that the wireless device is able to access.

8. The method of claim 1, wherein the core network node is access and mobility management function (AMF).

9. The method of claim 1, further comprising:
transmitting, to a user equipment (UE), an identifier related to the RRC inactive state.

10. A method performed by a core network node in a wireless communication system, the method comprising:
receiving, from a base station, information regarding a radio resource control (RRC) state of a wireless device based on the wireless device entering an RRC inactive state, wherein the wireless device is in a core network connected state during the RRC inactive state; and
transmitting a downlink signaling to the base station.

11. The method of claim 10, wherein the information regarding the RRC state of the wireless device is received via at least one of (i) an S1 interface between the base station and the core network node, or (ii) an NG1 control plane (CP) interface between the base station and the core network node.

12. The method of claim 10, further comprising receiving a user equipment (UE) context of the wireless device from the base station.

13. A base station configured to operate in a wireless communication system, the base station comprising:
a transceiver; and
a processor coupled to the transceiver and configured to:
transmit, to a core network node, information regarding a radio resource control (RRC) state of a wireless device based on the wireless device entering an RRC inactive state, wherein the wireless device is in a core network connected state during the RRC inactive state; and
perform a radio access network (RAN) paging for the wireless device based on that the wireless device is in the RRC inactive state.

14. The method of claim 10, wherein the core network node is related to mobility management.

15. The method of claim 10, wherein the core network node is access and mobility management function (AMF).

* * * * *